US012283817B2

(12) United States Patent
Martínez Huerta et al.

(10) Patent No.: US 12,283,817 B2
(45) Date of Patent: Apr. 22, 2025

(54) ENABLING A COMPUTING RESOURCE OF A COMPUTING POOL

(71) Applicant: FUNDACIÓ PER A LA UNIVERSITAT OBERTA DE CATALUNYA, Barcelona (ES)

(72) Inventors: Borja Martínez Huerta, Sant Cugat del Vallès (ES); Xavier Vilajosana Guillen, Cardedeu (ES); Cristina Cano Bastidas, Olesa de Montserrat (ES); Marc Guerrero Molero, Bigues I Riells (ES)

(73) Assignee: FUNDACIÓ PER A LA UNIVERSITAT OBERTA DE CATALUNYA, Barcelona (ES)

( * ) Notice: Subject to any disclaimer, the term of this patent is extended or adjusted under 35 U.S.C. 154(b) by 496 days.

(21) Appl. No.: 17/787,260

(22) PCT Filed: Dec. 18, 2019

(86) PCT No.: PCT/EP2019/086049
§ 371 (c)(1),
(2) Date: Jun. 17, 2022

(87) PCT Pub. No.: WO2021/121584
PCT Pub. Date: Jun. 24, 2021

(65) Prior Publication Data
US 2023/0030371 A1    Feb. 2, 2023

(51) Int. Cl.
*H02J 3/14*     (2006.01)
*G06Q 10/0631*  (2023.01)
(Continued)

(52) U.S. Cl.
CPC ........ *H02J 3/144* (2020.01); *G06Q 10/06312* (2013.01); *G06Q 10/06315* (2013.01);
(Continued)

(58) Field of Classification Search
CPC .. H02J 3/003; H02J 3/004; H02J 3/144; H02J 3/381; H02J 7/00034; H02J 2300/20;
(Continued)

(56) References Cited

U.S. PATENT DOCUMENTS 7,606,719 B2    10/2009  Barness et al.
9,588,537 B2 *   3/2017  Westergaard .......... G05B 15/02
(Continued)

FOREIGN PATENT DOCUMENTS

CH          711067 A1    11/2016
CN        105225016 A     1/2016
(Continued)

OTHER PUBLICATIONS

International Search Report and Written Opinion mailed Jun. 20, 2020 Application No. PCT/EP2019/086049, 21 pages.
(Continued)

*Primary Examiner* — Crystal J Barnes-Bullock
(74) *Attorney, Agent, or Firm* — SQUIRE PATTON BOGGS (US) LLP (57) ABSTRACT

There is provided a method, a system, a storage medium and an orchestrator to enable a computer resource of a computing pool. In particular, the methods and apparatuses of the present disclosure are configured to enable a computing resource (16) of one or more computing pools (17), the computing resource (16) being in communication with a converter (13) of a renewable energy source (12). The methods and apparatuses may be configured to:
 tracking an electrical consumption of one or more electrical appliances (14) in communication with the converter;
 enabling the computing resource (16) in response to determining a surplus of renewable electrical energy provided by the renewable energy source (12); and to
(Continued)

determining that there is computation demand from the one or more computing pools (17); and to determining that an estimated efficiency of use of the renewable energy is greater when responding to the demand of the one or more computing pools (17) than when injecting the renewable energy into an electrical grid (11) in communication with the converter (13).

18 Claims, 3 Drawing Sheets

(51) Int. Cl.
    *H02J 3/00* (2006.01)
    *G01W 1/10* (2006.01)

(52) U.S. Cl.
    CPC .............. *H02J 3/003* (2020.01); *H02J 3/004* (2020.01); *G01W 1/10* (2013.01); *H02J 2300/20* (2020.01)

(58) Field of Classification Search
    CPC ..... H04L 41/0897; G01W 1/10; G06Q 10/04; G06Q 10/06; G06Q 10/063; G06Q 10/0631; G06Q 10/06312; G06Q 10/06315; G06Q 50/06; G05B 15/02
    USPC .......................................... 700/295
    See application file for complete search history.

(56) References Cited

U.S. PATENT DOCUMENTS

| | | | |
|---|---|---|---|
| 9,607,343 B2* | 3/2017 | Chen ....................... | G06Q 50/06 |
| 9,837,821 B2* | 12/2017 | Galati ..................... | H02J 3/144 |
| 10,037,501 B2* | 7/2018 | Kaushik .................. | G06Q 10/04 |
| 10,234,835 B2* | 3/2019 | Liu .......................... | G06Q 50/06 |
| 11,043,815 B2* | 6/2021 | Meeker .................. | G06Q 50/06 |
| 2008/0195561 A1 | 8/2008 | Herzig | |
| 2011/0004357 A1 | 1/2011 | Mathiowetz | |
| 2012/0150359 A1 | 6/2012 | Westergaard | |
| 2012/0324245 A1 | 12/2012 | Sinha et al. | |
| 2014/0257907 A1 | 9/2014 | Chen et al. | |
| 2015/0170080 A1 | 6/2015 | Kaushik | |
| 2015/0186904 A1 | 7/2015 | Guha et al. | |
| 2016/0011617 A1 | 1/2016 | Liu et al. | |
| 2016/0098794 A1 | 4/2016 | Mokhtari et al. | |
| 2016/0247085 A1 | 8/2016 | Harper, III et al. | |
| 2018/0025423 A1 | 1/2018 | Utsumi et al. | |
| 2019/0036340 A1 | 1/2019 | Meeker et al. | |
| 2019/0258523 A1 | 8/2019 | Tappeiner et al. | |
| 2021/0221247 A1* | 7/2021 | Daniel .................. | G06Q 10/06 |
| 2021/0284040 A1* | 9/2021 | Grunkemeyer ..... | H02J 7/00034 |
| 2024/0006890 A1* | 1/2024 | Cavraro ................ | H02J 3/381 |
| 2024/0236017 A1* | 7/2024 | Guim Bernat ...... | H04L 41/0897 |

FOREIGN PATENT DOCUMENTS

| | | | | |
|---|---|---|---|---|
| CN | 107967536 A | | 4/2018 | |
| CN | 109284336 A | | 1/2019 | |
| EP | 2457132 A1 | | 5/2012 | |
| EP | 3392997 B1 | | 3/2021 | |
| JP | 2011/002929 A | | 1/2011 | |
| WO | WO-2005029243 A2 | * | 3/2005 | .............. F24F 11/30 |
| WO | WO-2010027278 A1 | * | 3/2010 | ................ G06Q 50/06 |
| WO | WO 2012/113438 A1 | | 8/2012 | |
| WO | WO 2014/197931 A1 | | 12/2014 | |

OTHER PUBLICATIONS

Nov, et al: "Volunteer computing: A model of the factors determining contribution to community-based scientific research", WWW 2010; Research Paper Jan. 2010; DOI:10.1145/1772690.1772766.

Wierman, et al: "Opportunities and challenges for data center demand response", International Green Computing Conference, IEEE; Nov. 3, 2014; pp. 1-10; XP032734888.

* cited by examiner

ENABLING A COMPUTING RESOURCE OF A COMPUTING POOL

CROSS-REFERENCE TO RELATED APPLICATIONS

This application is a national-stage filing under 35 USC 371 (c) of International Application No. PCT/EP2019/086049, filed Dec. 18, 2019. The entire contents of this application are incorporated by reference herein in their entirety for all purposes.

BACKGROUND

Renewable energy sources, such as solar photovoltaic, wind power, geothermal, biomass, or hydropower spruces may be alternatives to non-renewable energy sources such as fossil and nuclear and the adoption of renewable energy sources is rising rapidly throughout different countries. In addition, electricity generated by a particular or local renewable energy source deployment can be injected into an energy companies' grid. A local energy network or local electrical installation may be understood as an electrical installation which may comprise an interconnection of electrical components, such as power distribution cables, for powering appliances, such as printers, personal computers, washing machines, etc., at least a common electrical connection point in connection to an external electrical grid, or public grid, and one or more sockets to which appliances may be plugged in. In some cases, the produced energy by the local energy network may not be consumed by the one or more appliances connected to the local network. In some cases, "excess energy" is injected to the grid wherein "excess energy" may comprise power which is not being currently consumed by the one or more appliances connected to the local network, or energy which will not be used during a period of time. Some energy companies may discard or dissipate some of the injected energy, for example in cases were such energy is forecasted not to be consumed by final users. In some cases, a user may inject power into the grid, but the grid may not store such power in the form of energy.

There is a need to manage and maximize the effective and efficient use for the excess energy.

DETAILED DESCRIPTION

Figure 1:
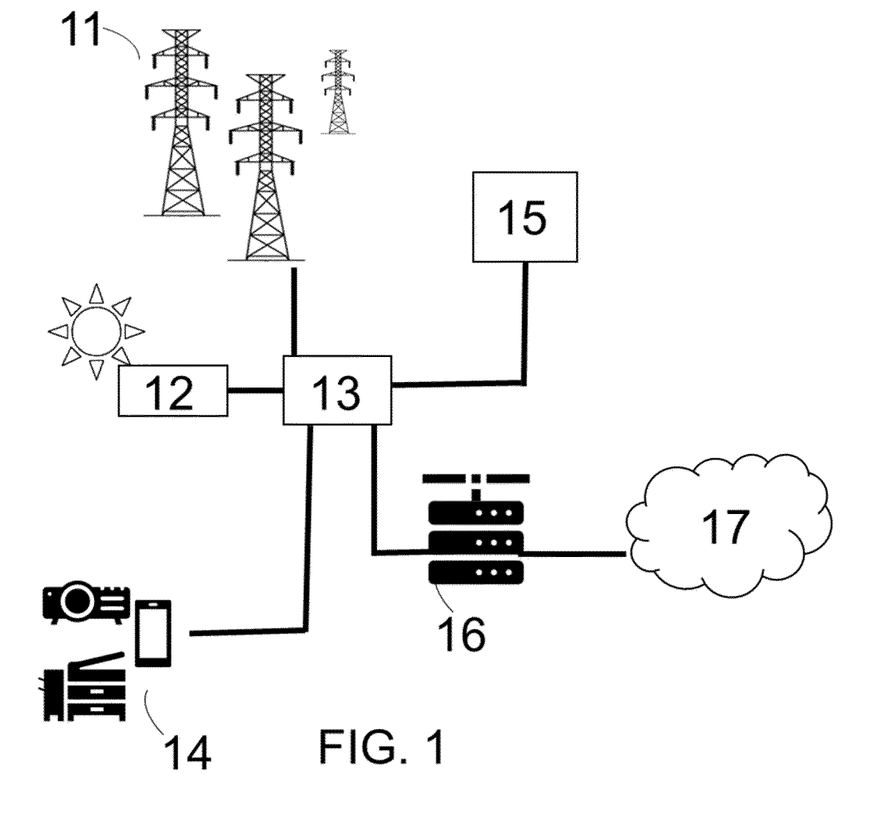
FIG. 1 is an example representation of a system according to the invention.

In a first aspect, there is provided a method for enabling one or more computing resources 16 of one or more computing pools 17. FIG. 1 depicts an example embodiment system comprising a utility company grid 11, a renewable energy source 12, which in the example of FIG. 1 is one or more photovoltaic panels 12. The photovoltaic panels are connected to a converter 13, which in the example is a DC-AC converter. The converter 13 is in communication with one or more electrical appliances 14, with an orchestrator 15 and with one or more computing resources 16. The converter may implement different functionalities, each of which may be implemented by different pieces of hardware, wherein the combination of the different pieces of hardware may be equivalent to a converter according to the present disclosure. The converter 13 may perform a conversion of energy between two types, for example, direct current DC to alternating current AC, or AC to DC or DC to DC. The converter may further switch or derivate the energy between and towards a local electrical network and/or an electrical energy storage device 36, such as a battery, and/or an external electricity grid 11. In the present disclosure the term local electrical network may refer to a local electrical installation which may comprise an interconnection of electrical components, such as power distribution cables for powering appliances, such as printers, personal computers, washing machines, electrical machines, etc., at least a common electrical point in connection to an external electrical grid, or public grid, and one or more sockets to which appliances may be plugged in. The terms local appliances 14 may refer to appliances connected to such local electrical network. The term local energy requirement may comprise an energy demand from appliances 14 in the local electrical network. The converter 13 may further meter and monitor the renewable energy produced by the renewable energy source and meter or monitor the energy consumption from local appliances 14. In the present disclosure a local electrical network may be understood as a network which is, at least in part, electrically powered by the renewable energy source 12 by electrically connecting to or electrically communicating with the converter 13.

The orchestrator 15 may be in data communication with the converter 13, either directly or via a data network, such as a wide area network, WAN, network, or the Internet, or a local area network, LAN, network. The one or more electrical appliances 14 may be in electrical communication with the converter 13. The computing resources 16 may be in data communication and in electrical communication with the converter 13. The example of FIG. 1 may comprise an electrical meter between, and in communication with, the utility grid 11 and the converter 13. Such electrical meter (not shown) may provide the electrical consumption of the electrical apparatuses connected to the converter 13 and may provide an account for the injected energy. The computing resource 16 is in data communication with a computing pool 17. The computing resource is said to be of the computing pool since the computing resource 16, when enabled, may be part of the computing pool 17, i.e. the computing resource 16, when enabled, connects to a computing pool 17 and executes a computation requested by the computing pool 17. In the present disclosure enabled or enabling may be understood as given or giving the ability to operate, or powering or powered, or waking up or waken up from an idle state or switching on or switched on. In the present disclosure a computing resource may comprise any physical or virtual component within a computer system. A computing resource 16 may be a personal computer, PC, or a server or a processor capable of executing instructions, functions or applications, which may be received from a computing pool 17.

A method for enabling one or more computing resources 16 of one or more computing pools 17 according to the first aspect may comprise:

tracking an electrical consumption of one or more electrical appliances 14 in communication with the converter;

enabling one or more computing resources 16 in response to determining that:

there is a surplus of renewable electrical energy provided by the renewable energy source 12, and there is computation demand from a computing pool 17; and an estimated efficiency of use of the renewable energy is greater when responding to the demand of the one or more computing pools 17 than when injecting the renewable energy into an electrical grid 11 in communication with the converter 13.

Tracking an electrical consumption of one or more electrical appliances 14 may comprise monitoring or forecasting an electrical consumption. The tracking may be performed by the converter 13, or by the controller or orchestrator 15 or the tracking may be performed by an appliance tracker, wherein the appliance tracker may send or transfer a read or metered signal to the orchestrator 15 or to the converter 13. In some examples, the metered signal may be performed by the meter in communication with the converter 13. In some examples, the meter may be further in communication with the grid 11. Tracking an electrical consumption may comprise monitoring consumed kilowatts, kW, consumed kilowatts hour, kWh, during a period, which period may comprise a current moment. Tracking an electrical consumption may comprise forecasting consumed kilowatts, kW, hour, kWh, during a future period. Forecasting a consumption may be based on an energy production forecast, based on historic data and/or weather conditions, or in user inputs such as a reservation time for charging an electrical energy storage device, for example the battery of a car. Tracking an electrical consumption may comprise tracking a local energy requirement based on a current energy demand from appliances 14, and/or a future usage pre-reservation, e.g. for an electric car, and/or a forecast based on usage patterns. Forecasting may also be based on user-imposed constraints, such as energy reservation for special or sporadic needs, emergency situations, or the like.

In some examples, tracking an electrical consumption of one or more electrical appliances 14 comprises forecasting electrical energy consumption of one or more electrical appliances 14 and/or monitoring historical electrical energy consumption from the one or more electrical appliances. The forecast may be performed based on weather conditions or weather forecast and may also comprise historical usage data of electronic appliances, for example, the times when an electric car is charged during the weekdays or during the weekend. The forecast may also be based on user reservation slots.

Enabling the computing resource 16 may comprise giving the ability to a computing resource to operate and to connect to a computing pool. Enabling may comprise switching one or more computing resources 16 on or may comprise powering one or more computing resources 16, or may comprise sending a wake up signal directly to a computing resource 16, or may comprise sending a wakeup signal to a wakeup controller 21, for example a Wake-on-LAN, sometimes referred to as WoL, for waking the computing resources 16 up from a low power mode or idle state. A "low power mode" may be understood as if a computer is switched-off and has access to a power source. Enabling may further comprise connecting or to be connected to the computing pool 17. Enabling may further comprise or be followed by a message sent from an orchestrator to indicate to which pool the computing resource 16 should be connected to for processing data and applications provided by such computing pool 17. In the present disclosure enabled or enabling may be understood as given or giving the ability to operate, or powering or powered, or waking up or waken up from an idle state or switching on or switched on. In the present disclosure a computing resource may comprise any physical or virtual component within a computer system. A computing resource 16 may be a personal computer, PC, or a server or a processor capable of executing instructions, functions or applications, which may be received from a computing pool 17.

A computing resource 16 may be enabled in response to determining that there is a surplus of renewable electrical energy provided by the renewable energy source 12. The electrical energy required by the one or more appliances 14 may be acknowledged by the converter 13 when metering a consumption of the one or more appliances 14 or by an independent meter or by a forecasting algorithm forecasting the consumption of the one or more electrical appliances based on historical patterns and/or meteorological conditions and/or other parameters. In some examples, a surplus of energy comprises:

an excess of renewable energy compared to the electrical energy required by the one or more appliances 14; and/or an excess of renewable electrical energy provided by the renewable energy source 12 during an energy period compared with an electrical energy required by the one or more appliances 14 during the energy period; and/or an excess of an electrical energy stored by an electrical energy storage device 36 compared with an electrical energy required by the one or more appliances 14 during the energy period; and/or an excess of renewable electrical energy provided by the renewable energy source 12 and the electrical energy storage device compared with an electrical energy required by the one or more appliances 14 during the energy period; and/or an excess of renewable electrical energy provided by the renewable energy source 12 compared with at least the sum of an electrical energy needed for covering a computation demand and the electrical energy required by the one or more appliances during the computation period; and/or an excess of an electrical energy stored by an electrical energy storage device compared with at least the sum of an electrical energy needed for covering a computation demand and the electrical energy required by the one or more appliances during the computation period; and/or an excess of renewable electrical energy provided by the renewable energy source 12 and the electrical energy storage device compared with at least the sum of an electrical energy needed for covering a computation demand and the electrical energy required by the one or more appliances during the computation period.

In such examples, a surplus comprises an energy which is available and provided by the renewable energy source and/or by an electrical energy storage device, or battery, but which is not planned to be used locally, i.e. within the local electrical network, by the one or more appliances 14; instead, the available renewable energy may be injected to the grid 11. In some cases, excess energy may comprise that there is more renewable electrical energy than the electrical energy required by the one or more appliances 14 during the energy period. Such energy required by the one or more appliances 14 may be acknowledged via a monitoring provided by the converter. Further, a surplus may comprise that there is more renewable electrical energy provided by the renewable energy source 12 and/or by the battery during a computation period than the sum of an electrical energy needed for covering a computation demand and the electrical energy required by the one or more appliances during the computation period. In such cases a surplus comprises renewable energy for covering both an energy supply for the one or more appliances 14 and an energy supply for one or more computing resources 16, such that the one or more computing resources 16 cover the computational demand for servicing the one or more computing pools 17 or their computation demand. Servicing or responding to a computation demand of a computing pool may comprise powering computing resources, such as servers or computers during a period of time. Such powering may require amounts of energy which a user may prefer covering with renewable energy, for example, wind power, solar, geothermal, biomass, or hydropower. In such cases, a surplus of renewable energy may comprise evaluating whether the renewable energy required to power the computing resources will be provided by the renewable energy source, covering at the same time the requirements of the one or more appliances 14, and whether there may be a surplus, in which case, the surplus of energy may be used for enabling further computing resources for servicing further computing pools or may be injected into the grid, or may be stored in batteries.

A computing resource may be enabled if it is further determined that there is computation demand. A computation demand may be understood as cloud service demand from a computing pool 17. In the present disclosure computation demand may comprise a demand for using the computing resource or for reserving such computing resource even if such computing resource 16 may not compute or process any pool service. In occasions a computing pool, such as Amazon Web Services (AWS), may reserve a timeslot for a future use of a computing resource of an end user. Such reservation is comprised within the meaning of computer demand in the present disclosure.

For the purposes of the present disclosure, the term "cloud computing" is synonymous with computing performed by computers that are located remotely and accessed via the Internet. Cloud computing may incorporate virtualized storage, batch computing, virtualized computation, and web services and, software as a service—SaaS—, function as a service—FaaS—, Code as a service—CaaS—and infrastructure as a Service—IaaS—where the common theme is reliance on the Internet for satisfying the computing needs of the users. For example, Google Cloud provides computing and storage services that are hosted at Google computing facilities and accessible online. Those computing facilities can be accessed through an Application Programming Interface, API in order to orchestrate and manage the execution of remote applications, services, functions, storage, etc. Cloud computing infrastructures may consist of reliable services delivered through next-generation data centers that are built on computer and storage virtualization technologies. The services may be accessible anywhere in the world, with the Cloud appearing as a single point of access for all the computing needs of data consumers. As customers generally do not own the infrastructure, they are merely accessing or renting, they may forego capital expenditure and consume resources as a service, paying instead for what they use. Some cloud computing offerings are billed as a utility computing model, which is analogous to how traditional utilities, like electricity, are consumed, while others are billed on a subscription basis. Some other successful cloud architectures may have little or no established infrastructure or billing systems including Peer-to-peer networks like BitTorrent, fully decentralized like Bitcoin and volunteer computing like SETI@home.

A computing resource may be enabled if it is further determined that an estimated efficiency of use of the renewable energy is greater when responding to the demand of the one or more computing pools 17 than when injecting the renewable energy into an electrical grid 11 in communication with the converter 13. A determination that an estimated efficiency of use of the renewable energy is greater when responding to the demand of the one or more computing pools 17 than when injecting the renewable energy into an electrical grid 11 may be performed via a comparison between both estimated efficiencies: an estimated efficiency when responding to the demand of the one or more computing pools 17 and an estimated efficiency when injecting the renewable energy into an electrical grid 11. Such comparison may be performed after evaluating or calculating or determining both estimated efficiencies.

On the one hand, the estimated efficiency of use of the energy when injecting the renewable energy into the electrical grid 11 may be acknowledged via a report over the use of the injected renewable energy into the grid 11. For example, a report may state a place or a final use where the energy is being consumed by other electrical consumers, in which case the comparison may be made on the number of final appliances 14 versus computers 16 being served by the renewable energy. For example, a report may state whether the renewable energy is dissipated or discarded or actually distributed to electrical consumers in which case, the comparison may be made on the amount of energy actually used. The estimated efficiency of use of the energy when injecting the renewable energy into the electrical grid 11 may be acknowledged via a power dissipation which the transport of energy to final consumers 16 may imply, in which case a comparison may be made on the power dissipation to transport energy to the grid 11 versus to the computers 16. The estimated efficiency of use of the energy when injecting the renewable energy into the electrical grid 11 may be acknowledged via the market price of the energy, meaning that the lowest the market price of the energy, i.e. the price that consumers may pay for using such energy, the less the grid 11 may need further injected energy and the estimated efficiency of use may therefore be assumed low. Such assumption may be made under the point of view of a supply and demand model. The estimated efficiency of use of the energy when injecting the renewable energy into the electrical grid 11 may be acknowledged via a reward which is being offered to end users for injecting their renewable energy into the grid 11 and in which case the comparison may be made on a reward obtained. A reward may comprise a discount in the electrical bill offered by a public grid 11. A reward may comprise a revenue offered by the grid 11 for KWh injected into the grid 11. An efficient use of the renewable energy injected into the grid 11 may comprise effective or real use, i.e.: avoiding transport of the renewable energy which may induce transport losses due to dissipation the renewable energy. In contrast, an inefficient use may comprise a non-responsible use of the renewable energy such as using an Air Conditioning, AC, A/C, or air con, by a user at its maximum power during non-warm days, or using lighting by a company during nights even if employees do not work night shifts, and so on.

On the other hand, the estimated efficiency of use of the renewable energy when responding to the demand of the one or more computing pools 17 may be acknowledged via the amount of computing pools 17 which may be served by powering one or more computing resources 16 with the renewable energy provided by the renewable energy source 12 or by a battery storing renewable energy, in which case the comparison may be made on the number of final appliances 14 versus computers 16 being served by the renewable energy. The estimated efficiency of use of the renewable energy when responding to the demand of the one or more computing pools 17 may be acknowledged via a power dissipation which the transport of energy to one or more computer resources 16 may imply in which case a comparison may be made on the power dissipation to transport energy to the grid 11 versus to the computers 16. The estimated efficiency of use of the renewable energy when responding to the demand of the one or more computing pools 17 may be acknowledged via a reward offered by the one or more computing pools 17 to which the one or more computing resources 16 will be connected to when enabled, in which case the comparison may be made on the reward obtained.

A comparison between estimated efficiencies may therefore comprise a comparison in terms of number of appliances 14 versus number of computing resources 16 which may be served by the renewable energy, or an estimated power which will be actually used in both cases, grid or computing pool, or in terms of the power dissipation which the transport of energy to a final destination of consumption may imply in both cases, or in terms of an estimated reward which may be acquired in both cases.

Figure 2:
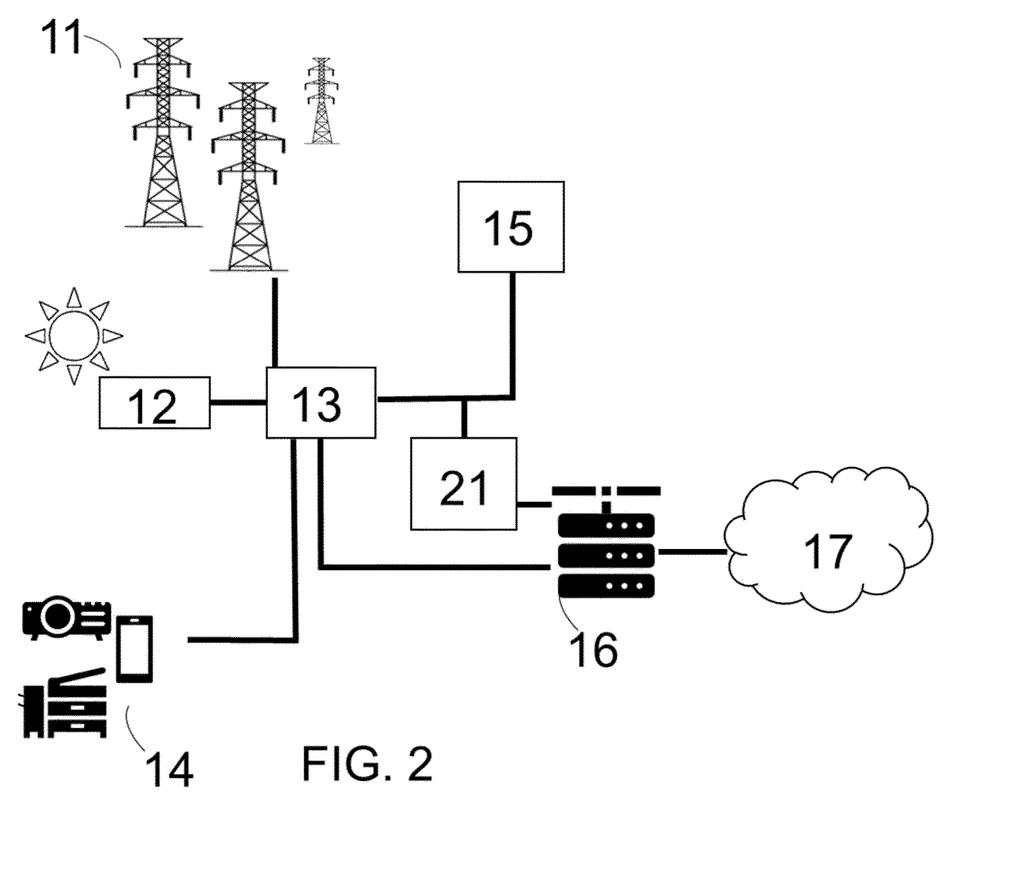
FIG. 2 is an example representation of a system according to the invention.

In the case where there is a surplus of energy or excess energy, the method may advantageously enable or wake up a computing resource 16 for performing operations, run applications or compute data as requested by a computing pool 17. In the case where there is no computation demand from the computing pool 17, the method may disable the computing resource 16, so that the converter 13 redirects electrical power to the grid 11. Alternatively, in the case where there is no computation demand from the computing pool 17, the method may enable or indicate the converter 13 to inject electrical power to the grid 11. The methods disclosed herein may handle exceeding energy production, including the injection of energy to the utility company 11 by channeling it to the grid, or by storing energy locally or temporally, for example in an electrical energy storage device, or by allocating the energy to alternative applications such as computations of a computing pool 17, amongst other uses. A controller or orchestrator 15 may be aware of a real time energy production, consumption and production excess of a particular renewable energy source, e.g. a domestic solar system 12, a wind turbine, etc. The orchestrator 15 may also keep track of the historical consumption and/or production patterns in the renewable energy source. The orchestrator 15 may further track the consumption of one or more computing resources 16. In addition, the orchestrator 15 may further track one or more computing resources 16, which computing resources 16 offer computing capabilities requiring energy to operate. The computing resources 16 are powered by the renewable energy source 12 through a converter 13 and may be enabled or disabled by the use a wakeup controller 21, as shown in FIG. 2. The orchestrator 15 may register such computing resources 16 to a computation pool 17 where a cloud orchestrator (not shown) can deploy functions, containers or virtual machine or applications as demanded by third party consumers or cloud service provider. The orchestrator 15 may decide or indicate when to dynamically lease the computing resources 16 to the computation pool 17 and the duration of such lease. Such decision may integrally be performed locally by the orchestrator 15. The orchestrator 15 may further enable other services such as batch computing. The orchestrator may further receive an announcement of a computational resource stating which resources a computing resource 16 is able to offer during a computation period and may receive a computational demand from a computing pool 17; if both the computational resource and the computational demand coincide or match, the orchestrator may further connect such computing resource 16 to such computing pool 17. The latter procedure may be named as Bid and Ask procedure or Auction Market.

In some examples, determining that there is computation demand from one or more computing pools 17 comprises forecasting a computation demand for a predetermined period of time or computation period. In such examples, a computation demand may be acknowledged for a period of time, meaning that determining that there is computation demand for enabling a computer resource 16 may consider whether the computing demand may last for a period of time or may last for a period of time bigger than a threshold, for example.

In some examples, the electrical consumption comprises one or more of:
  an electrical instantaneous power consumption, for example the grid may be demanding instantaneous power due to peaks in the demand of electricity;
  an electrical energy consumption during a consumption period, for example an energy required during 2 hours;
and the computation demand comprises one or more of:
  a computational resource per time unit; for example, a processor per hour. In such case a capacity of such processor may not be considered;
  a computational capacity per time unit, for example Gb of memory per hour or flops of the processor per hour;
  a computational capacity during a computation period, for example Gb or flops of the processor during a computation period;
  an electrical energy needed for covering a computation demand during the computation period, for example the quantity of MW needed for powering one or more computing resources 16 so that the computational demand may be covered or responded to;
  a reward per computational capacity, for example a number of Gb per hour;
  a reward per computational capacity during a computation period, for example a reward given by the computing pool 17 for obtaining computational capacity during one or more hours.

In the methods of the present disclosure, the orchestrator 15 may trigger or enable a computing resource through a wakeup controller shown in FIG. 2. When enabled, the computing resource 16 may join a computation pool 17, for example for a specified duration or computation period, for example an hour. During such period, excess or surplus energy is consumed by the computing resource 16 and such energy is thereby consumed in an alternative way than injected to the grid and possibly suffering losses due to transportation. In some cases, a reward or some revenue may be generated by the computation pool 17 and obtained by end users owning the computing resource 16, e.g. by executing operations or running applications requested by the computing pool 17. The orchestrator 15 may track energy production, consumption, excess energy and may forecast excess energy for a computation period e.g. one hour or some hours, as well as other relevant information such as if there is an electrical energy storage device in the system and its charge state. After the computation period, also known as lease time, the orchestrator 15 may switch off or disable the computing resource 16. The lease time may be determined by the orchestrator 15. The lease time may be determined according to a minimum computing time offered by the orchestrator 15, an estimation of the energy availability of the renewable energy source 12, a computing reward or revenue and a possible energy revenue in case computation is not performed. Revenues may be estimated by the orchestrator 15 considering a computing price paid by the computing pool 17 and the purchase and sale energy price of the energy in a particular location.

In the present disclosure computational capacity may comprise GB of Memory, Number of CPU Cores, Number of CPU Threads, CPU Frequency. In the present disclosure computational capacity during a computation period may comprise GB of Memory, Number of CPU Cores, Number of CPU Threads, CPU Frequency during a period of time in hours. In the present disclosure—
- a reward per computational capacity may comprise $/hour, or $/hour/GB, or $/hour/GB/vCPU or an additional fee per request.

In some examples, enabling the computing resource 16 is further performed in response to a forecasted weather. In some examples, a renewable energy available for a following period, for example, for the following two hours, may depend on the weather conditions. If the weather forecast information comprises a windy period of two hours, then it may be inferred that in the following two hours there will be no clouds covering a solar panel, or that there may be sufficient wind to power wind power stations. In such cases, the renewable energy availability may be considered high or relatively high. In other examples, weather forecast information comprises a rainy period of 8 hours, and it then may be inferred that in the following 8 hours there will be a relatively high river flow so that a hydropower station installed next to a river may provide energy to power a water mill. With such information, the orchestrator 15 may consider that there will be sufficient available renewable energy to power a computing resource 16 for the following 8 hours, and the orchestrator 15 may therefore decide to enable the computing resource 16.

In examples, the orchestrator 15 decides whether a computing resource 16 is to be enabled when the following conditions are met:
- the estimated efficiency of use of the renewable energy by the grid 11 is lower than the estimated efficiency of use of such renewable energy by power sourcing the one or more appliances and the one or more computing resources 16, and there is computation demand during a computation period from the computing pool 17, and a forecasted weather allows determining that the renewable energy, i.e.: wind or solar, generated during a following computation period will allow one or more computing resources 16 to be powered during the computation period demanded by the computing pool 17;
- the demand of energy in the grid 11 is low because there is no need of energy in the grid;
- the revenue obtained by the grid 11 is lower than the revenue obtained by the computing pool 17 during a computation period;
- the local energy required from appliances both current or forecasted according to historical patterns, and a future usage energy pre-reservation, for example for powering a battery of a car, are lower than the produced energy and therefore the surplus is enough to power one or more computing resources 16.

If such conditions are not met, surplus or excess energy may not be used for computation and the orchestrator 15 may remain on hold letting the energy converter 13 inject the excess energy to the grid 11, charge an electrical energy storage device or just discard the energy as it cannot be consumed.

In some examples, the orchestrator 15 monitors the reward assigned to computation resources so that the orchestrator 15 may enable a computing resource 16 for a lease period or computation period. In addition, the orchestrator 15 may notify the computing pool 17 to allocate computation to the newly attached or joint computing resource 16. After a lease period the orchestrator 15 may disable the computing resource 16.

In some examples, the method comprises selecting a computing pool 17 from the one or more computing pools 17; enabling a number of computing resources 16 out of a total number of computing resources, thereby enabling a communication between the number of computing resources 16 and the selected computing pool 17. For example, a total number of computing resources 16 may be 9 personal computers, PCs, and a number of computing resources may be 4 PCs. In this example a computing pool is selected and 4 PCs out of 9 are enabled, enabling thereby a communication between 4 PCs and the computing pool. As it may be understood, 9 and 4 PCs are only non-limitative examples of the number and total number of PCs which may be enabled by a method according to the present disclosure.

In some examples, the methods of the present disclosure comprise
- selecting a computing pool 17 out of a first number of computing pools, for example, selecting a computing pool out of 10 computing pools;
- enabling a particular computing resource 16 out of a second number of computing resources 16, for example enabling a particular computing resource 16 out of 20 computing resources, thereby enabling a communication between the particular computing resource 16 and the selected computing pool 17;
- iterating the method until a third number of computing pools 17 is connected to a fourth number of computing resources 16, wherein the first number is greater or equal than the second number and wherein the third number is greater or equal than the fourth number, for example iterating until 9 computing pools are connected to 15 computing resources.

As it will be understood, the numbers are non-limitative examples and other number of computing pools and computing resources may be selected and connected. For example, a scenario may comprise 3 computing resources and 2 computing pools, and the 3 computing resources may be enabled thereby enabling a communication and connection with a first one of the 2 computing pools, or the computing resources may be distributed in the following manner: 2 for the first computing pool and one computing resource for the second pool. For example, a scenario may comprise 5 computing resources and 4 computing pools: 3 computing resources may be enabled thereby enabling a communication and connection with a first pool of the 4 computing pools, and 1 computing resource may be enabled to connect to a second computing pool; in such a case, 1 computing resource may not be connected to any computing pool and two computing pools may not be connected to any computing resource.

In some examples, selecting a computing pool 17 comprises comparing a computation demand from each of the computing pools 17 with the rest of the computing pools. In such examples a computation demand may comprise a need for computing resources measured in Gb or flops for a period of one hour. A computation demand may comprise a reward given by a computing pool 17 to a computing resource 16 or to an owner of the computing resource 16. Such computation demands may be compared to one another for selecting one of the computing pools 17 to which a computing resource 16 will be connected or will be enabled to connect to.

In some examples, selecting a computing pool 17 comprises comparing the surplus with the renewable electrical energy required to power the one or more computing resources 16 which covers the demand of each of the computing pools 17. For example, if the surplus allows powering one or more computing resources 16 for responding to the demand of a first computing pool 17 and does not allow powering one or more computing resources 16 for responding to the demand of a second computing pool 17, then the first computing pool 17 may be selected. The electrical energy required to power the one or more computing resources 16 covering the demand of each of the computing pools 17 may be evaluated or calculated based on properties of the computing resources 16 such as the powering requirements. If for example a forecasted renewable energy for being injected into the grid 11 is lower than the renewable energy which will be used by one or more computing resources 16, then servicing a computing pool 17 may be selected in detriment of selecting injecting the renewable energy into the grid. An electrical renewable energy forecasted for being injected into the electrical grid 11 may be provided by a meter connected to the one or more appliances or by an orchestrator or by a converter capable of forecasting an available renewable energy based on current electrical consumption of the one or more appliances and/or historical patterns. Comparing the surplus with the renewable electrical energy required to power the one or more computing resources 16 may be performed in terms of an absolute or positive value of both energies in KWh. Comparing the surplus with the renewable electrical energy required to power the one or more computing resources 16 may be performed in terms of, for example, a reward given by the grid for injecting renewable energy may be compared to the reward the computing pool 17 may offer for allowing a computing resource 16 to operate according to the computing pool 17 needs. Based on such comparations, responding to a computing pool may be selected in detriment of a selection to inject energy into the utility grid 11.

In some examples, selecting a computing pool 17 comprises comparing a computation demand from each of the computing pools 17 with the rest of the computing pools 17 during a computation period. As in previous examples, a computation demand may be compared between computing pools. Besides, such a computation demand may be compared during a period of time for selecting one of the pools 17. For example, a first computing pool may need 50 Gb during 30 minutes, and a second computing pool may need 30 Gb during 75 minutes. The first pool actually needs 50 Gb*0.5 h=25 Gbh whereas the second computing pool needs 30 Gb*1.25 h=37.5 Gbh. The selection may comprise selecting the pool needing more Gbh, and therefore, the second pool may be selected. The selection may further comprise selecting the pool needing less Gbh, maybe because the forecasted available renewable energy for powering the computing resource 16 may be low and, therefore, the first pool may be selected. In other examples, for example, a first computing pool may reward 5 cents per minute and may need a computing resource for 15 minutes, and a second computing pool may reward 1 cent per minute and may need a computing resource for 255 minutes. The first pool's absolute reward is higher than the second pool's absolute reward, 5 cents versus 1 cent, but actually the total reward obtained by the second pool is three times the reward obtained by servicing the first pool. The selection may comprise selecting the pool from which the higher reward is obtained.

In some examples, selecting a computing pool 17 comprises comparing the computation demand of a computing pool 17 with the energy which is reserved by a user. For example, if a computation demand from the pool 17 exceeds a threshold, responding to the computing pool is prioritized in detriment of the user reservation. If, for example, the computation demand does not reach such threshold, the priority may be to reserve the available energy for the user's reservation in detriment of the computing pool 17. If, for example, the computation demand overpasses such threshold, the priority may be to use the energy for one or more computing resources 16 for responding to the computation demand in detriment of the user's reservation.

In some examples, the electrical consumption of one or more electrical appliances 14 is zero, which may mean that the one or more appliances are not working or are unplugged or that there is no domestic electrical consumption. In such a case, tracking an electrical consumption of one or more electrical appliances 14 in communication with the converter 13 may result in a null value and therefore, the surplus may comprise the net energy provided by the renewable energy source and the possibly stored renewable energy in an electrical energy storage device, or battery.

In a second aspect, the present disclosure presents, as seen in FIG. 1, a system comprising:

a renewable energy source installation 12;
   a converter 13 in communication with the energy source installation 12;
   one or more electrical appliances 14 in communication with the converter 13;
   an electrical grid 11 in communication with the converter 13;
   one or more computing resources 16 in communication with the converter 13;
   an orchestrator 15 in communication with the converter 13, the computing resource 16 and the electrical grid 11 wherein the orchestrator 15 is configured to perform any of the methods of the present disclosure.

The converter may be a DC/DC converter, or an AC/AC converter, or a DC/AC inverter, depending on the type of renewable energy source. For example, a photovoltaic installation may be connected to a DC/AC inverter and a wind power source may be connected to an AC/AC converter. The converter may implement different functionalities, each of which may be implemented by different pieces of hardware, wherein the combination of the different pieces of hardware may be equivalent to a converter according to the present disclosure.

The converter may further switch or derivate the energy between and towards a local electrical network and/or an electrical energy storage device and/or an external electricity grid 11. The converter 13 may further meter and monitor the renewable energy produced by the renewable energy source and meter or monitor the energy consumption from local appliances 14. In the present disclosure a local electrical network may be understood as a network which is, at least in part, electrically sourced by the renewable energy source 12 by electrically connecting to or electrically communicating with the converter 13.

In some examples, the one or more computing resources 16 are further in communication with one or more wakeup controllers 21, as seen in FIG. 2, wherein the wakeup controllers are in communication with the orchestrator 15.

In some examples, the orchestrator, the converter and the computing resource are in a common local area network LAN.

In some examples, the orchestrator 15 is comprised in the converter 13. A smart converter may thereby be provided.

In some examples, the orchestrator 15, the converter 13, the computing pool 17 and the computing resource 16 are in communication through a wide area network, WAN, such as the Internet.

Figure 3:
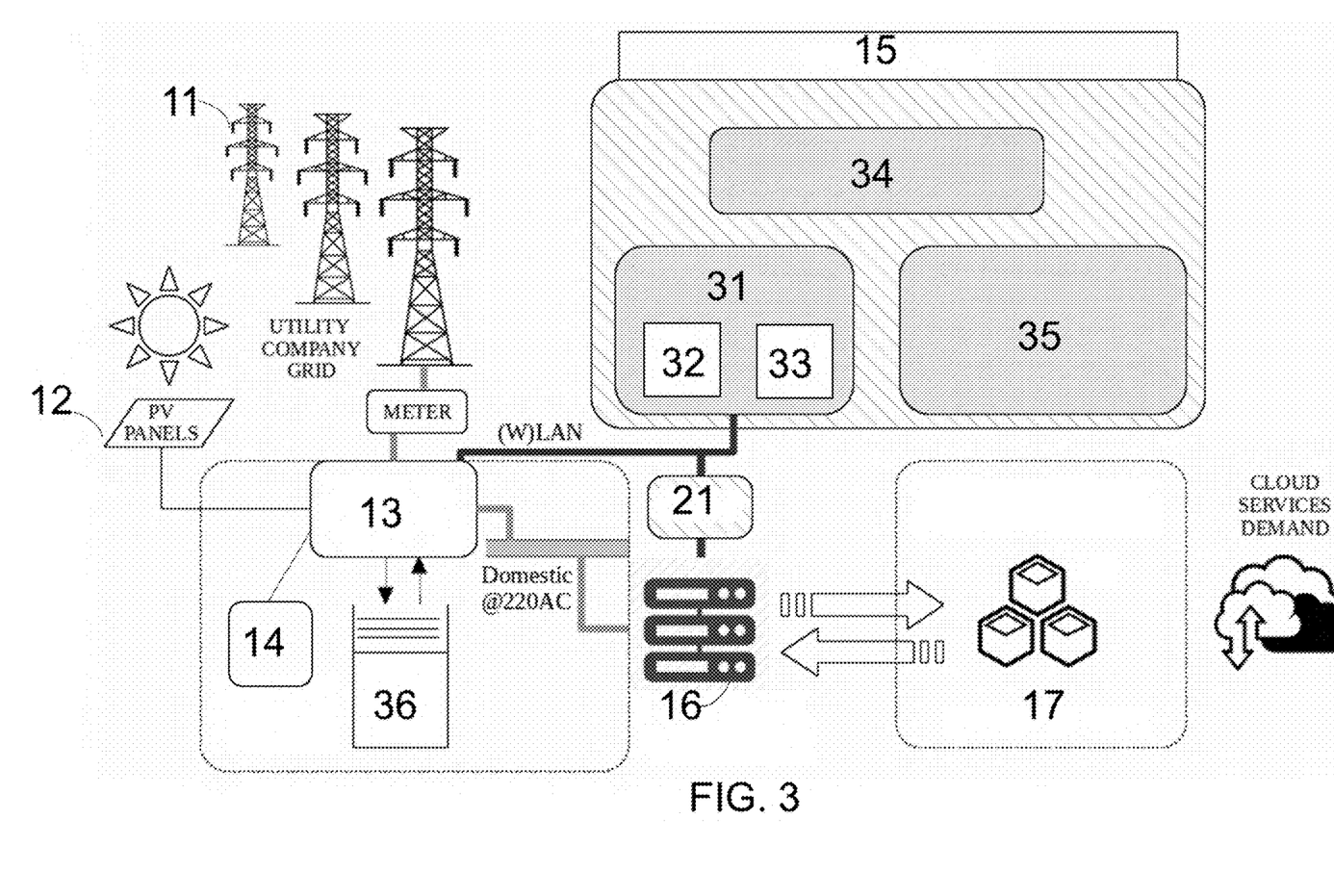
FIG. 3 is a schematic representation of a system according to the invention.

As seen in FIG. 3, in some examples the system may comprise an energy buffer 36 in electrical connection to the converter 13.

In a third aspect, there is provided a computer-readable medium storing executable instructions that, when executed by a processor, cause the processor to operate according to one of the methods of the present disclosure.

In some examples, a transitory or a non-transitory machine-readable storage medium encoded with instructions executable by a processor, comprises:
  instructions to track an electrical consumption of one or more electrical appliances 14 in communication with the converter;
  instructions to determine that there is a surplus of renewable electrical energy provided by the renewable energy source 12;
  instructions to determine that there is computation demand from the one or more computing pools 17;
  instructions to determine that an estimated efficiency of use of the renewable energy is greater when responding to the demand of the one or more computing pools 17 than when injecting the renewable energy into an electrical grid 11 in communication with the converter 13; and
  instructions to enable the computing resource 16 in response to previous determinations.

The machine-readable storage medium or data storage may be any electronic, magnetic, optical, or other physical storage device that contains or stores executable instructions. Thus, the machine-readable storage medium may be, for example, Random Access Memory (RAM), an Electrically Erasable Programmable Read-Only Memory (EEPROM), a storage device, an optical disc, and the like. In some implementations, the machine-readable storage medium may be a non-transitory machine-readable storage medium, where the term "non-transitory" does not encompass transitory propagating signals. The machine-readable storage medium may be encoded with a series of instructions executable by a processor. The instructions may cause a processor to carry out any of the methods described in this disclosure.

In a fourth aspect, there is provided an orchestrator 15 in communication with a converter 13 of a renewable energy source 12 and in communication with a computing resource 16 of a computing pool 17, the orchestrator 15 configured to:
  track an electrical consumption of one or more electrical appliances 14 in communication with the converter;
  enable the computing resource 16 in response to determining that:
    there is a surplus of renewable electrical energy provided by the renewable energy source 12; and
    there is computation demand from a computing pool 17; and
    an estimated efficiency of use of the renewable energy is greater when responding to the demand of the one or more computing pools 17 than when injecting the renewable energy into an electrical grid 11 in communication with the converter 13.

As explained previously, in some examples, a surplus of energy comprises:
  an excess of renewable energy compared to the electrical energy required by the one or more appliances 14; and/or
  an excess of renewable electrical energy provided by the renewable energy source 12 during an energy period compared with an electrical energy required by the one or more appliances 14 during the energy period; and/or
  an excess of an electrical energy stored by an electrical energy storage device 36 compared with an electrical energy required by the one or more appliances 14 during the energy period; and/or
  an excess of renewable electrical energy provided by the renewable energy source 12 and the electrical energy storage device compared with an electrical energy required by the one or more appliances 14 during the energy period; and/or
  an excess of renewable electrical energy provided by the renewable energy source 12 compared with at least the sum of an electrical energy needed for covering a computation demand and the electrical energy required by the one or more appliances during the computation period; and/or
  an excess of an electrical energy stored by an electrical energy storage device compared with at least the sum of an electrical energy needed for covering a computation demand and the electrical energy required by the one or more appliances during the computation period; and/or
  an excess of renewable electrical energy provided by the renewable energy source 12 and the electrical energy storage device compared with at least the sum of an electrical energy needed for covering a computation demand and the electrical energy required by the one or more appliances during the computation period.

An orchestrator according to the present disclosure may be configured to perform any one of the methods and example methods of the present disclosure.

As seen in FIG. 3, the orchestrator 15 may comprise different memory or hardware sections dedicated to performing different functions or the orchestrator 15 may comprise different reserved areas equipped with instructions to perform different functions. For example, the orchestrator 15 may comprise a local infrastructure manager 31 comprising an energy tracker 32 and a facilities manager 33 The energy tracker may be dedicated to tracking the energy provided locally by the renewable energy source and consumed locally by the one or more appliances 14 and by the computing resources 16. The facilities manager 33 may indicate to the wakeup controller 21 to wake up one or more computing resources such that a communication is enabled between the one or more computing resources 16 and one or more computing pools 17. Waking up a computing resource may comprise or may be followed by sending a message indicating the computing pool 17 to which the computer resource 16 may be connected to. The orchestrator 15 may, in some examples, comprise an energy use optimizer 34. The energy use optimizer 34 may be dedicated to determining the most efficient use of the energy, by comparing the estimated efficiency on the use of energy injecting it to the grid with the estimated efficiency on the use of the energy for computation, based on metrics such as local use of the energy, obtained reward, minimization of energy waste, maximization of global utility or minimization of global energy expenditure. Such comparison may be performed after converting and/or normalizing both efficiencies units. The orchestrator 15 may, in some examples, comprise a cloud infrastructure manager 35. The cloud infrastructure manager 35 may be dedicated to managing the communication between the computing resources 16 and the computing pool 17, for example the cloud infrastructure manager 35 may manage the establishment of a communication or the disengagement or termination of communication. In addition, the cloud infrastructure manager 35 may track the allocation of computing tasks to the computing resources 16 when connected to the computing pool 17, and may also record a demanded computing time, function calls, or other demand metrics. The cloud infrastructure manager 35 may further collect statistics about the computing pool 17 demand patterns such as peak hours, demand per day, etc. The cloud infrastructure manager 35 may use the collected information to forecast the computation demand from the different computing pools 17.

An example application may comprise a hydropower station installed in a school and a local converter of such hydropower station connected to the utility grid through a utility meter. An energy generated by the photovoltaic system may be consumed, stored in an electrical energy storage device or injected into the grid. The example may comprise an orchestrator or tracker connected to the converter and to the Internet which tracks production of energy and may comprise a historical database of energy usage patterns in the hydropower station.

A computing resource, such a server computer may be connected to the orchestrator and the orchestrator may have the ability to turn on and off such computer as well as to orchestrate certain software running on it. A computing pool may be offered online over the Internet so that customers can lease computing resources in a software as a service, SaaS, or in a function as a service, FaaS, model. The orchestrator may continuously track energy generation, efficiency of use of the energy when it is injected into the grid and computation demand from the computing pool. The orchestrator may also forecast the excess energy that is not to be used according to the usage patterns and environmental and/or weather conditions forecast in the school. Usage patterns may comprise that appliances 14 do not consume any energy during the weekend. The orchestrator may maximize the renewable energy consumed in the school. When, for example, the renewable energy that can be used through joining a computer into a computing pool is higher than the renewable energy that can be used by storing or injecting the energy into the grid, the orchestrator determines to boot a computing resource connected to the local converter and join it to an online computing pool. A pool manager may then schedule tasks to the pool according to the demand.

A further example application may comprise a photovoltaic production system installed in a school and a converter of such photovoltaic system connected to the utility grid through a utility meter. An energy generated by the photovoltaic system may be consumed, stored in an electrical energy storage device or injected into the grid and paid back by the utility company at a dynamic market price. The example may comprise an orchestrator or tracker connected to the converter and to the Internet which tracks production of energy, purchase and sales energy prices and which apparatus may comprise a historical database of energy usage patterns in the photovoltaic system.

A computing resource, such a server computer may be connected to the orchestrator and the orchestrator may have the ability to turn on and off such computer as well as orchestrate certain software running on it. A computing pool may be offered online in the Internet so customers can lease computing resources in a software as a service, SaaS, or in a function as a service, FaaS, model. The orchestrator 15 may be aware of a dynamic pricing model for a SaaS execution unit. The orchestrator may continuously track energy generation, electricity market pricing and the price the computing pool 17 is paying to launch applications into specific computing resources 16. The orchestrator 15 may also forecast the excess energy that is not to be used according to the usage patterns and environmental and/or weather conditions forecast in the school. The orchestrator 15 may maximize the income of the school. When the benefit that can be obtained through joining a computer into a computing pool and selling computing services is higher than the benefit that can be obtained by storing or selling the energy, the orchestrator determines to boot an attached computing resource and join it to an online computing pool. A pool manager may then schedule tasks to the pool according to the demand. Usage time is accounted, and the user may be paid back for the delivered computation capacity, e.g. GB of Memory, Number of CPU Cores, Number of CPU Threads, CPU Frequency.

There may exist three or more operation model. In a first model or Idle Wait the orchestrator at the school premises may notify to the computing pool the availability of computing resources. Such notification may be performed after forecasting that in a following timeslot there will be a surplus of energy. The orchestrator may then instruct the computing resources to connect to the pool, waiting for available computing tasks. In such case, if the pool grants tasks to the computing resources, the tasks are executed, and the pool manager accounts for the computing time to invoice the pool provider. After completing the tasks, the orchestrator and the computing resources return to the waiting state, waiting for more computing jobs. The first model implies that, in the case where tasks are not assigned to compute, the computing resources spend some energy, due to having been connected to the pool just waiting. The first model may therefore lead to small economic losses during that specific slot, since the energy could have been sold to the network. On the other hand, it maximizes the probability of receiving tasks to compute because, although at the beginning of the slot there are no tasks available, the fact of being connected allows the device to receive new tasks that appear during the slot.

In a second model or "connection on demand", the orchestrator, after forecasting that there will have available energy, negotiates with the computing pool or plans the computing jobs to be executed before joining the pool e.g. selling its computing resources. In this way, the computing device only connects to the pool if there is a previous agreement, therefore minimizing energy losses.

In a third model auction model or "bid and ask" model, the orchestrator may receive an announcement of a computational resource from a computing resource and may receive a computational demand from a computing pool 17; if both the computational resource and the computational demand coincide or match, the orchestrator may connect such computing resource 16 to such computing pool 17.

As seen in these examples, during a lease period, accounting is performed considering computing time obtained from the computing pool 17 and dynamic computing pricing obtained by the orchestrator 15 for the particular computing pool where computing resources 16 may be added.

In addition to computing time or computation period, accounting can consider other metrics such as the number and duration of function executions, depending on whether the deployed applications are functions or containers, memory resources allocated, hardware resources, location, etc.

The preceding description has been presented to illustrate and describe certain examples. Different sets of examples have been described; these may be applied individually or in combination, sometimes with a synergetic effect. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

The invention claimed is:

1. A method for enabling one or more computing resources (16) of one or more computing pools (17), the computing resources (16) being in communication with a converter (13) of a renewable energy source (12), the method comprising:
  tracking an electrical consumption of one or more electrical appliances (14) in communication with the converter;
  enabling the one or more computing resources (16) in response to determining that:
    there is a surplus of renewable electrical energy provided by the renewable energy source (12), and
    there is computation demand from a computing pool (17); and
    an estimated efficiency of use of the renewable energy is greater when responding to the demand of the one or more computing pools (17) than when injecting the renewable energy into an electrical grid (11) in communication with the converter (13).

2. The method of claim 1 wherein enabling the computing resource comprises sending a wakeup signal from a wakeup controller (21) to the computing resource.

3. The method of claim 1, wherein tracking comprises forecasting electrical energy consumption of one or more electrical appliances (14) and/or monitoring historical electrical energy consumption from the one or more electrical appliances (14).

4. The method of claim 1, wherein determining that there is computation demand from one or more computing pools (17) comprises forecasting the computation demand for a predetermined period of time.

5. The method of claim 1, wherein enabling the computing resource (16) is further performed in response to a forecasted weather.

6. The method of claim 1, wherein the electrical consumption comprises one or more of:
  an electrical instantaneous power consumption
  an electrical energy consumption during a consumption period;
and the computation demand comprises one or more of:
  a computational resource per time unit;
  a computational capacity per time unit;
  a computational capacity during a computation period;
  an electrical energy needed for covering the computation demand during the computation period;
  a reward per computational capacity;
  a reward per computational capacity during the computation period.

7. The method of claim 1, wherein a surplus of energy comprises one or more of:
  an excess of renewable energy compared to the electrical energy required by the one or more appliances (14), and/or
  an excess of renewable electrical energy provided by the renewable energy source (12) during an energy period compared with an electrical energy required by the one or more appliances (14) during the energy period; and/or
  an excess of an electrical energy stored by an electrical energy storage device compared with an electrical energy required by the one or more appliances (14) during the energy period;
  an excess of renewable electrical energy provided by the renewable energy source (12) and the electrical energy storage device compared with an electrical energy required by the one or more appliances (14) during the energy period;
  an excess of renewable electrical energy provided by the renewable energy source (12) compared with at least the sum of an electrical energy needed for covering a computation demand and the electrical energy required by the one or more appliances during the computation period;
  an excess of an electrical energy stored by an electrical energy storage device compared with at least the sum of an electrical energy needed for covering the computation demand and the electrical energy required by the one or more appliances during the computation period; and
  an excess of renewable electrical energy provided by the renewable energy source (12) and the electrical energy storage device compared with at least the sum of an electrical energy needed for covering the computation demand and the electrical energy required by the one or more appliances during the computation period.

8. The method of claim 1, further comprising
  selecting a computing pool (17) from the one or more computing pools (17);
  enabling a number of computing resources (16) out of a total number of computing resources, thereby enabling a communication between the number of computing resources (16) and the selected computing pool (17).

9. The method of claim 8 wherein selecting a computing pool (17) comprises comparing one or more of:
  a computation demand from each of the computing pools (17) with the rest of the computing pools;
  the surplus with the renewable electrical energy required to power the one or more computing resources (16) which covers the demand of each of the computing pools (17);
  a computation demand from each of the computing pools (17) with the rest of the computing pools (17) during a computation period;
  a computation demand of a computing pool (17) with the energy which is reserved by a user.

10. The method of claim 1, further comprising
  selecting a computing pool (17) out of a first number of computing pools (17);
  enabling a particular computing resource (16) out of a second number of computing resources (16), thereby enabling a communication between the particular computing resource (16) and the selected computing pool (17);
  iterating the method until a third number of computing pools (17) is connected to a fourth number of computing resources (16), wherein the first number is greater than or equal to the second number and wherein the third number is greater than or equal to the fourth number.

11. The method of claim 1 wherein the electrical consumption of one or more electrical appliances (14) is zero.

12. A system comprising
a renewable energy source installation (12);
a converter (13) in communication with the energy source installation (12);
one or more electrical appliances (14) in communication with the converter (13);
an electrical grid (11) in communication with the converter (13);
one or more computing resources (16) in communication with the converter (13);
an orchestrator (15) in communication with the converter (15), the computing resource (16) and the electrical grid (11) wherein the orchestrator (15) is configured to perform the method of claim 1.

13. The system of claim 12 wherein the one or more computing resources (16) are further in communication with one or more wakeup controllers (21), wherein the wakeup controllers are in communication with the orchestrator (15).

14. The system of claim 12 wherein the orchestrator, the converter and the computing resource are in a common local area network (LAN).

15. The system of claim 12 wherein the orchestrator is comprised in the converter.

16. The system of claim 12 wherein the orchestrator, the converter, the computing pool and the computing resource are in communication through a wide area network (WAN).

17. A non-transitory computer-readable medium storing executable instructions that, when executed by a processor, cause the processor to operate a method according to claim 1.

18. An orchestrator (15) in communication with a converter (13) of a renewable energy source (12) and in communication with a computing resource (16) of a computing pool (17), the orchestrator (15) configured to
track an electrical consumption of one or more electrical appliances (14) in communication with the converter;
enable the computing resource (16) in response to determining that:
there is a surplus of renewable electrical energy provided by the renewable energy source (12), and
there is computation demand from a computing pool (17); and
an estimated efficiency of use of the renewable energy is greater when responding to the demand of the one or more computing pools (17) than when injecting the renewable energy into an electrical grid (11) in communication with the converter (13).

* * * * *